United States Patent [19]
Miller

[11] Patent Number: 5,762,353
[45] Date of Patent: Jun. 9, 1998

[54] REAR SUSPENSION BICYCLE FRAME

[76] Inventor: John Jeremy Miller, 15504 Spring Hill La., Pflugerville, Tex. 78660

[21] Appl. No.: 596,650

[22] Filed: Feb. 5, 1996

[51] Int. Cl.⁶ .................................................. B62K 25/28
[52] U.S. Cl. .......................................... 280/284; 280/288.3
[58] Field of Search ............................ 280/281.1, 283, 280/284, 285, 286, 288.3

[56] References Cited

U.S. PATENT DOCUMENTS

| 4,505,492 | 3/1985 | Tsunoda ............................. 280/284 |
| 5,072,961 | 12/1991 | Huppe ............................. 280/284 X |
| 5,413,368 | 5/1995 | Pong et al. ...................... 280/285 X |

FOREIGN PATENT DOCUMENTS

| 155582 | 3/1954 | Australia ......................... 280/284 |
| 247162 | 5/1966 | Austria ........................... 280/284 |
| 2673906 | 9/1992 | France ............................ 280/285 |
| 224251 | 3/1925 | United Kingdom .............. 280/288.3 |

*Primary Examiner*—Kevin Hurley

[57] ABSTRACT

A frame for resiliently supporting an individual relative to a ground surface. The inventive device includes an elongated main frame member having a steering tube mounted to a first end and a rear fork pivotally mounted to a second end thereof. A spring assembly extends between the main frame member and the rear fork to support the same in a collinear orientation. A pair of pivot pins extend through the main frame member to pivotally couple the rear fork thereto, the second pivot pin supports a guide pulley which directs a drive chain relative to the rear fork to permit articulation of the rear fork without interference with the chain.

15 Claims, 2 Drawing Sheets

REAR SUSPENSION BICYCLE FRAME

BACKGROUND OF THE INVENTION

1. Field of the Invention

The present invention relates to bicycle frame structures and more particularly pertains to a rear suspension bicycle frame for resiliently supporting an individual relative to a ground surface.

2. Description of the Prior Art

The use of bicycle frame structures is known in the prior art. More specifically, bicycle frame structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle frame structures include U.S. Pat. No. 4,856,801; U.S. Pat. No. 4,582,343; U.S. Pat. No. 5,306,036; U.S. Pat. No. 4,679,811; and U.S. Pat. No. 5,226,674.

While these devices fulfill their respective, particular objectives and requirements, the aforementioned patents do not disclose a rear suspension bicycle frame for resiliently supporting an individual relative to a ground surface which includes an elongated main frame member having a steering tube mounted to a first end and a rear fork pivotally mounted to a second end thereof, a spring assembly extending between the main frame member and the rear fork to support the same in a collinear orientation, a pivot pin extending through the main frame member to pivotally couple the rear fork thereto, and a guide pulley rotatably mounted to the pivot pin which directs a drive chain relative to the rear fork to permit articulation of the rear fork without interference with the chain.

In these respects, the rear suspension bicycle frame according to the present invention substantially departs from the conventional concepts and designs of the prior art, and in so doing provides an apparatus primarily developed for the purpose of resiliently supporting an individual to a ground surface.

SUMMARY OF THE INVENTION

In view of the foregoing disadvantages inherent in the known types of bicycle frame structures now present in the prior art, the present invention provides a new rear suspension bicycle frame construction wherein the same can be utilized for resiliently supporting an individual to a ground surface. As such, the general purpose of the present invention, which will be described subsequently in greater detail, is to provide a new rear suspension bicycle frame apparatus and method which has many of the advantages of the bicycle frame structures mentioned heretofore and many novel features that result in a rear suspension bicycle frame which is not anticipated, rendered obvious, suggested, or even implied by any of the prior art bicycle frame structures, either alone or in any combination thereof.

To attain this, the present invention generally comprises a frame for resiliently supporting an individual relative to a ground surface. The inventive device includes an elongated main frame member having a steering tube mounted to a first end and a rear fork pivotally mounted to a second end thereof. A spring assembly extends between the main frame member and the rear fork to support the same in a collinear orientation. The first side of the rear fork comprises a first lateral fork portion which projects substantially orthogonally from the pivot pin and extends colinearly from the main frame member to couple with an unlabeled axle of the rear wheel. Similarly, the second side of the rear fork comprises a second lateral fork portion which orthogonally extends from a second pivot pin and projects colinearly from the main frame member to couple with the axle of the rear wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rear suspension bicycle frame apparatus and method which has many of the advantages of the bicycle frame structures mentioned heretofore and many novel features that result in a rear suspension bicycle frame which is not anticipated, rendered obvious, suggested, or even implied by any of the prior art bicycle frame structures, either alone or in any combination thereof.

It is another object of the present invention to provide a new rear suspension bicycle frame which may be easily and efficiently manufactured and marketed.

It is a further object of the present invention to provide a new rear suspension bicycle frame which is of a durable and reliable construction.

An even further object of the present invention is to provide a new rear suspension bicycle frame which is susceptible of a low cost of manufacture with regard to both materials and labor, and which accordingly is then susceptible to low prices of sale to the consuming public, thereby making such rear suspension bicycle frames economically available to the buying public.

Still yet another object of the present invention is to provide a new rear suspension bicycle frame which provides in the apparatuses and methods of the prior art some of the advantages thereof, while simultaneously overcoming some of the disadvantages normally associated therewith.

Still another object of the present invention is to provide a new rear suspension bicycle frame for resiliently supporting an individual relative to a ground surface.

Yet another object of the present invention is to provide a new rear suspension bicycle frame which includes an elongated main frame member having a steering tube mounted to a first end and a rear fork pivotally mounted to a second end thereof, a spring assembly extending between the main frame member and the rear fork to support the same in a collinear orientation, a first and second pivot pin extending through the main frame member to pivotally couple the rear fork thereto, and a guide pulley rotatably mounted to the second pivot pin which directs a drive chain relative to the rear fork to permit articulation of the rear fork without interference with the chain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
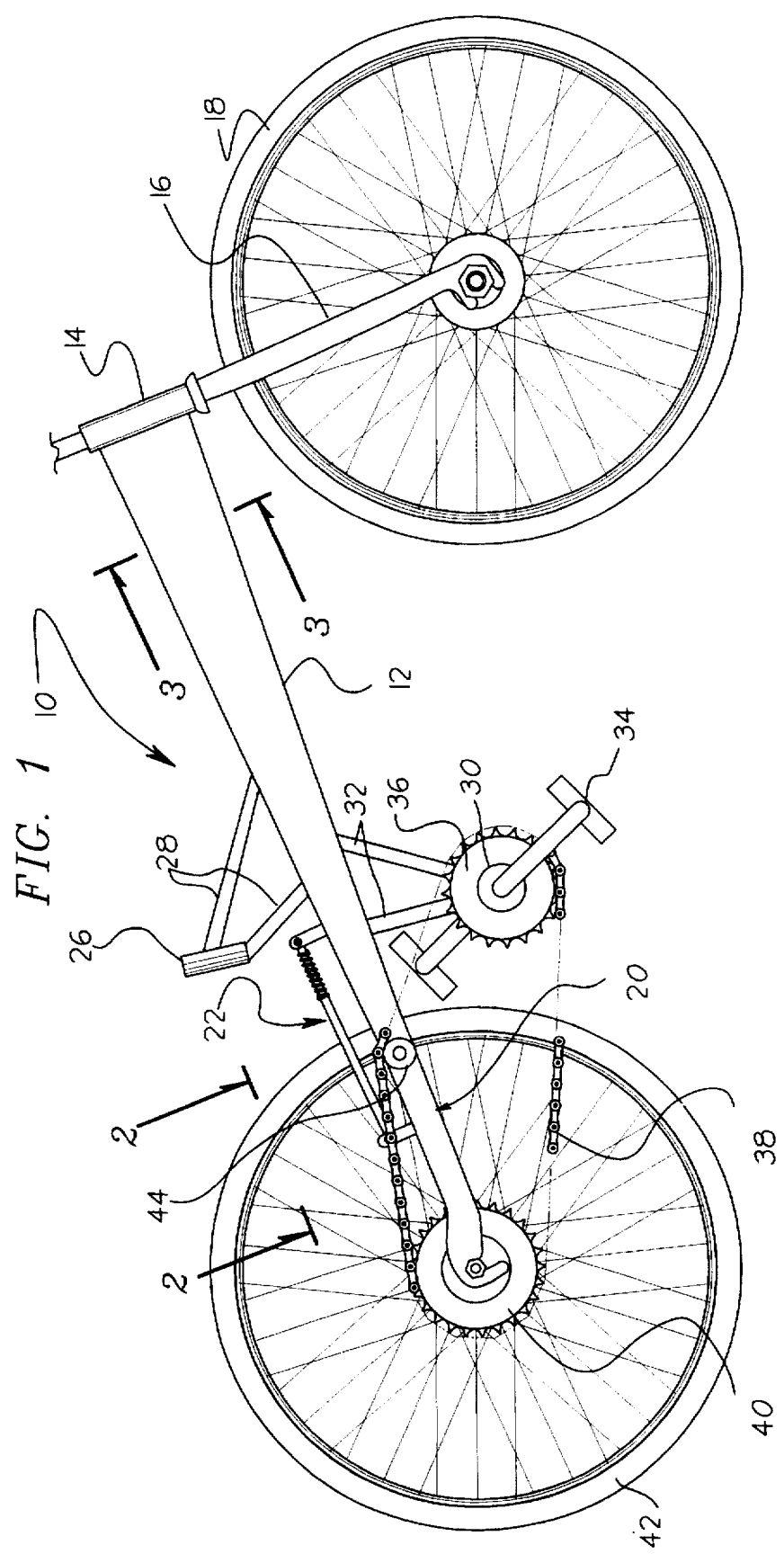
FIG. 1 is a side elevation view of a rear suspension bicycle frame according to the present invention.
Figure 2:
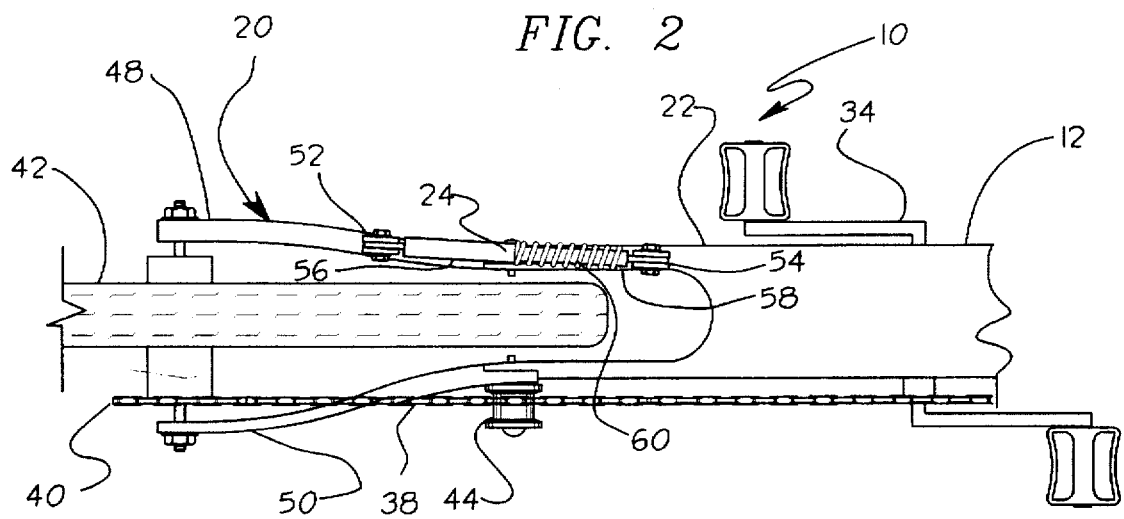
FIG. 2 is a top plan view of a portion of the invention taken from line 2—2 of FIG. 1.
Figure 3:
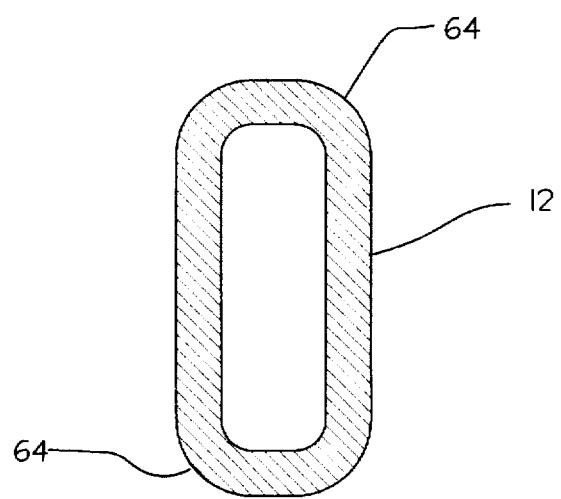
FIG. 3 is a cross sectional view taken along line 3—3 of FIG. 1.

With reference now to the drawings, and in particular to FIGS. 1-3 thereof, a new rear suspension bicycle frame embodying the principles and concepts of the present invention and generally designated by the reference numeral 10 will be described.

More specifically, it will be noted that the rear suspension bicycle frame 10 comprises an elongated main frame member 12 of generally linear configuration and including respectively opposed first and second ends. A steering tube 14 is secured to a first end of the main frame member 12 and is operable to receive conventionally known steering components such as a front fork 16 and an unillustrated handle bar which operate to support and control a front wheel 18 such as is shown in FIG. 1 of the drawings. A rear fork 20 is pivotally mounted to a second end of the main frame member 12 and extends colinearly therefrom. A spring means 22 extends between the rear fork 20 and the main frame member 12 so as to resiliently support the rear fork in the collinear orientation illustrated in FIG. 1 of the drawings. By this structure, the rear fork 20 is permitted to articulate relative to the main frame member 12 so as to resiliently support an individual relative to a ground surface during use of an associated bicycle.

As best illustrated in FIG. 1, it can be shown that the main frame member 12 tapers along a longitudinal length thereof from a first transverse dimension at the first end thereof proximal to the steering tube 14 to a second transverse dimension at the second end thereof proximal to the rear fork 20, wherein the first transverse dimension is substantially greater than the second transverse dimension as shown in the drawings. Further, and as shown in FIG. 2, the second end of the main frame member 12 is bifurcated so as to define spaced furcations positioned adjacent to a pivoting end of the rear fork 20. A pivot pin 24 projects through the furcations of the bifurcated second end of the main frame member 12 and through the pivoting end of the rear portion so as to pivotally couple the rear fork relative to the main frame member. A seat tube 26 is mounted to an upper portion of the main frame member 12 by at least one angled stanchion 28 extending therebetween. Similarly, a crank tube 30 is mounted to a lower portion of the main frame member 12 by at least one crank stanchion 32 extending therebetween. A crank assembly 34 is rotatably mounted relative to the crank tube 30 and includes a crank sprocket 36 over which a drive chain 38 extends. The chain 38 further extends over a wheel sprocket 40 of a rear wheel 42 mounted within the rear fork 20. By this structure, torque can be transferred from the crank assembly 34 through the chain 38 to the rear wheel 42 to propel the associated bicycle forward.

To preclude interference of the chain 38 with the rear fork 20 as it articulates relative to the main frame member 12, a guide pulley 44 is rotatably supported relative to the main frame member 12 by a pivot pin. As shown in FIG. 2, the chain 38 extends over the guide pulley 44 so as to extend above the rear fork 20 and onto the wheel sprocket 40 of the rear wheel 42. By this structure, the rear fork 20 is permitted to articulate in both directions relative to the main frame member 12 from the collinear orientation illustrated in FIG. 1 without the chain 38 interfering therewith.

Referring specifically now to FIG. 2, it can be shown that the rear fork 20 of the present invention 10 preferably comprises a pivot pin 24 positioned within one of the furcations of the bifurcated second end of the main frame member 12. This pivot pin 24 pivotally connects a first side of the rear fork 20 to a first side of the main frame member. Likewise, a similar pivot pin pivotally connects a second side of the rear fork 20 to a second side of the main frame member.

The first side of the rear fork 20 comprises a first lateral fork portion 48 which projects substantially orthogonally from the first pivot pin 24 and extends colinearly from the main frame member 12 to couple with an unlabeled axle of the rear wheel 42. Similarly, the second side of the rear fork 20 comprises a second lateral fork portion 50 which orthogonally extends from a second pivot pin 46 and projects colinearly from the main frame member 12 to couple with the axle of the rear wheel 42. The lateral fork portions 48 and 50 are fixedly interconnected via the axle of the rear wheel so as to pivot in unison as the rear fork 20 articulates relative to the main frame member 12. Thus, by way of a first and a second pivot pin which project through the furcations of the bifurcated second end of the main frame member and through the pivoting end of the rear fork the rear fork is pivotally coupled relative to the main frame member.

With continuing reference to FIG. 2 and concurrent reference FIG. 1, it can be shown that the spring means 22 of the present invention 10 preferably comprises a first spring support stanchion 52 fixedly secured to and projecting substantially orthogonally from the rear fork 20. A second spring support stanchion 54 is fixedly secured to and projects substantially orthogonally from the main frame member 12. A first telescoping member 56 is pivotally mounted to the first spring support stanchion 52 and extends therefrom to telescopingly interconnect with a second telescoping member 58 which is pivotally mounted to the second spring support stanchion 54. A coil spring 60 is interposed between the telescoping members 56 and 58 so as to bias the spring support stanchions 52 and 54 into the spaced orientation illustrated in FIG. 1 of the drawings so as to maintain the rear fork 20 in the collinear orientation relative to the main frame member 12. By this structure, the rear fork 20 is permitted to articulate relative to the main frame member 12 as the telescoping members 56 and 58 compress the coil spring 60. Further, it is desirable that the coil spring 60 to be fixedly secured to the telescoping members 56 and 58 such that an articulation of the rear fork 20 in a first direction will effect compression of the coil spring 60, with an articulation of the rear fork in a second direction effecting tensioning of the coil spring 60 so as to provide a resilient return of the rear fork 20 into the collinear orientation relative to the main frame member 12 regardless of a direction into which the rear fork had been pivoted.

As shown in FIG. 3, the main frame member 12 is preferably substantially rectangular in cross section and is desirably provided with rounded corner edges 64 which extend between orthogonally oriented outer planer surfaces thereof.

In use, the rear suspension bicycle frame 10 of the present invention can be easily utilized for resiliently an individual relative to a ground surface as an associated bicycle is ridden by such individual. The collinear orientation of the rear fork 20 relative to the main frame member 12 causes the main frame member 12 to assume an oblique orientation relative to a horizontal ground surface which permits either a male or female rider to comfortably ride an associated bicycle incorporating the rear suspension bicycle frame 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rear suspension bicycle frame comprising:
    an elongated main frame member including respectively opposed first and second ends;
    a steering tube secured to the first end of the main frame member;
    a rear fork pivotally mounted to the second to the second end of the main frame member and extending colinearly therefrom;
    a spring means having a spring means longitudinally axis parallel to a longitudinal axis the main frame member, the spring means extending between the rear fork and the main frame member so as to resiliently support the rear fork in a collinear orientation relative to the main frame member.

2. The rear suspension bicycle frame of claim 1, wherein the elongated main frame member is of a generally linear configuration.

3. The rear suspension bicycle frame of claim 2, wherein the main frame member tapers along a longitudinal length thereof from a first transverse dimension at the first end thereof proximal to the steering tube to a second transverse dimension at the second end thereof proximal to the rear fork, wherein the first transverse dimension is substantially greater than the second transverse dimension.

4. The rear suspension bicycle frame of claim 3, and further comprising a seat tube mounted to an upper portion of the main frame member by at least one angled stanchion extending therebetween.

5. The rear suspension bicycle frame of claim 1, wherein the second end of the main frame member is bifurcated so as to define spaced furcations positioned adjacent to a pivoting end of the rear fork; and further comprising a first and a second pivot pin projecting through the furcations of the bifurcated second end of the main frame member and through the pivoting end of the rear fork so as to pivotally couple the rear fork relative to the main frame member.

6. The rear suspension bicycle frame of claim 5, and further comprising a crank tube mounted to a lower portion of the main frame member by at least one crank stanchion extending therebetween; a crank assembly rotatably mounted relative to the crank tube and including a crank sprocket; and a drive chain extending over the crank sprocket.

7. The rear suspension bicycle frame of claim 6, and further comprising a rear wheel mounted to the rear fork, the rear wheel including a wheel sprocket mounted thereto.

8. A rear suspension bicycle frame comprising:
    an elongated main frame member including respectively opposed first and second ends;
    a steering tube secured to the first end of the main frame member;
    a rear fork pivotally mounted to the second end of the main frame member and extending colinearly therefrom;
    a spring means extending between the rear fork and the main frame member so as to resiliently support the rear fork in a collinear orientation relative to the main frame member;
    wherein the second end of the main frame member is bifurcated so as to define spaced furcations positioned adjacent to a pivoting end of the rear fork;
    a first and a second pivot pin projecting through the furcations of the bifurcated second end of the main frame member and through the pivoting end of the rear fork so as to pivotally couple the rear fork relative to the main frame member;
    a crank tube mounted to a lower portion of the main frame member by at least one crank stanchion extending therebetween;
    a crank assembly rotatably mounted relative to the crank tube and including a crank sprocket; and
    a drive chain extending over the crank sprocket;
    a rear wheel mounted to the rear fork, the rear wheel including a wheel sprocket mounted thereto; and a guide pulley rotatably supported relative to the main frame member by the second pivot pin, with the chain extending over the guide pulley so as to extend above the rear fork and onto the wheel sprocket of the rear wheel.

9. The rear suspension bicycle frame of claim 8, wherein a first lateral fork portion projects from the first pivot pin and extending colinearly from the main frame member to couple with the rear wheel; a second lateral fork portion projects from the second pivot pin and extends colinearly from the main frame member to couple with the rear wheel.

10. The rear suspension bicycle frame of claim 9, wherein the spring means comprises a first spring support stanchion fixedly secured to and projecting from the rear fork; a second spring support stanchion fixedly secured to and projecting from the main frame member; a first telescoping member pivotally mounted to the first spring support stanchion and extending therefrom; a second telescoping member pivotally mounted to the second spring support stanchion and telescopingly interconnected with the first telescoping member; a coil spring interposed between the telescoping members so as to bias the spring support stanchions into a spaced orientation to maintain the rear fork in the collinear orientation relative to the main frame member.

11. The rear suspension bicycle frame of claim 10, wherein the coil spring is fixedly secured to the telescoping members such that an articulation of the rear fork in a first direction will effect compression of the coil spring, with an articulation of the rear fork in a second direction effecting tensioning of the coil spring so as to provide a resilient return of the rear fork into the collinear orientation relative to the main frame member.

12. The rear suspension bicycle frame of claim 11, wherein the main frame member is substantially rectangular in cross section and includes orthogonally oriented outer planer surfaces and rounded corner edges which extend between the outer planer surfaces thereof.

13. The rear suspension bicycle frame of claim 8, wherein the elongated main frame member is of a generally linear configuration.

14. The rear suspension bicycle frame of claim 13, wherein the main frame member tapers along a longitudinal length thereof from a first transverse dimension at the first end thereof proximal to the steering tube to a second transverse dimension at the second end thereof proximal to the rear fork, wherein the first transverse dimension is substantially greater than the second transverse dimension.

15. The rear suspension bicycle frame of claim 14, and further comprising a seat tube mounted to an upper portion of the main frame member by at least one angled stanchion extending therebetween.

* * * * *